United States Patent
Zhang et al.

(10) Patent No.: US 9,756,500 B2
(45) Date of Patent: *Sep. 5, 2017

(54) SERVICE PROCESSING METHOD AND RELATED DEVICE

(71) Applicant: Huawei Technologies Co., Ltd., Shenzhen, Guangdong (CN)

(72) Inventors: Yanping Zhang, Shanghai (CN); Fenqin Zhu, Shanghai (CN); Shufeng Shi, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/242,030

(22) Filed: Aug. 19, 2016

(65) Prior Publication Data
US 2016/0360398 A1    Dec. 8, 2016

Related U.S. Application Data

(63) Continuation of application No. 14/806,231, filed on Jul. 22, 2015, now Pat. No. 9,456,318, which is a
(Continued)

(51) Int. Cl.
*H04W 4/00*   (2009.01)
*H04W 8/04*   (2009.01)
(Continued)

(52) U.S. Cl.
CPC ............. *H04W 8/04* (2013.01); *H04W 4/005* (2013.01); *H04W 4/12* (2013.01); *H04W 4/14* (2013.01);
(Continued)

(58) Field of Classification Search
USPC ................... 455/428–453, 456.1–456.3, 466
See application file for complete search history.

(56) References Cited

U.S. PATENT DOCUMENTS 9,247,471 B2 *   1/2016   Velev ................... H04W 4/005
9,432,823 B2 *   8/2016   Wu .......................... H04W 4/14
(Continued)

FOREIGN PATENT DOCUMENTS

CN      101998313 A      3/2011
CN      102388630 A      3/2012
(Continued)

OTHER PUBLICATIONS

"MME initiated removal of registration of MME for SMS", Huawei, Hisilicon, 3GPP TSG-SA WG2 Meeting #99, Sep. 23-27, 2013, 4 pages, S2-133392.
(Continued)

*Primary Examiner* — Dai A Phuong

(57) ABSTRACT

A service processing method and related devices are disclosed. The method includes: receiving, by a mobility management entity (MME), an access request message from a user equipment; determining, by the MME, whether the access request message from the user equipment is an attach message or a tracking area update request message; and if the MME has been registered as a short message serving node of the user equipment in a home subscriber server (HSS) and it is determined that the access request message is the attach message or the tracking area update request message, sending, by the MME, a notification to the HSS to inform the HSS to cancel registration of the MME as the short message serving node of the user equipment.

11 Claims, 5 Drawing Sheets

Related U.S. Application Data continuation of application No. PCT/CN2013/070937, filed on Jan. 24, 2013.

(51) Int. Cl.
  *H04W 68/00* (2009.01)
  *H04W 4/12* (2009.01)
  *H04W 4/14* (2009.01)
  *H04W 84/04* (2009.01)

(52) U.S. Cl.
  CPC ........ *H04W 68/005* (2013.01); *H04W 84/042* (2013.01)

(56) References Cited

U.S. PATENT DOCUMENTS

| | | |
|---|---|---|
| 2010/0261490 A1 | 10/2010 | Berry et al. |
| 2011/0105117 A1 | 5/2011 | Chin |
| 2011/0165898 A1 | 7/2011 | Drevon et al. |
| 2013/0044709 A1 | 2/2013 | Adjakple et al. |
| 2013/0267263 A1* | 10/2013 | Tseng ............... H04W 4/14 455/466 |
| 2013/0279476 A1* | 10/2013 | Yu .................... H04W 68/02 370/331 |
| 2014/0004890 A1 | 1/2014 | Cai et al. |
| 2014/0050132 A1* | 2/2014 | Ronneke ............ H04W 76/02 370/310 |
| 2014/0141763 A1* | 5/2014 | Suh ................... H04W 4/001 455/418 |
| 2014/0235283 A1* | 8/2014 | Jain .................. H04L 27/2657 455/466 |
| 2014/0287752 A1* | 9/2014 | Stojanovski ......... H04W 4/14 455/435.1 |
| 2014/0370923 A1 | 12/2014 | Wu |
| 2015/0011250 A1* | 1/2015 | Xu .................... H04W 4/14 455/466 |
| 2015/0023234 A1* | 1/2015 | Ronneke ............ H04W 76/02 370/310 |
| 2015/0030019 A1 | 1/2015 | Chandramouli |
| 2015/0049668 A1* | 2/2015 | Cho .................. H04W 48/18 370/328 |
| 2015/0098321 A1 | 4/2015 | Jeong |
| 2015/0281924 A1* | 10/2015 | Vikberg ............. H04W 4/14 455/466 |
| 2015/0296354 A1 | 10/2015 | Liao et al. |
| 2016/0127968 A1 | 5/2016 | Velev |
| 2016/0183156 A1* | 6/2016 | Chin ................ H04W 36/0022 370/331 |
| 2016/0353259 A1* | 12/2016 | Stojanovski ......... H04W 4/14 |

FOREIGN PATENT DOCUMENTS

| | | |
|---|---|---|
| RU | 2431941 C2 | 10/2011 |
| RU | 2452136 C2 | 5/2012 |

OTHER PUBLICATIONS

"MME initiated removal of registration of MME for SMS", Huawei, Hisilicon, 3GPP TSG-SA WG2 Meeting #99, Sep. 23-27, 2013, 4 pages, S2-133391.

"SMS in MME—Registration Procedures for MME", Ericsson, 3GPP TSG CT WG1 Meeting #79, Aug. 6-10, 2012, 3 pages, C1-123402.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11)", 3GPP TS 29.272 V11.4.0, Sep. 2012, 117 pages.

"3rd Generation Partnership Project; Technical Specification Group Services and System Aspects; Circuit Switched (CS) fallback in Evolved Packet System (EPS); Stage 2 (Release 11)", 3GPP TS 23.272 V11.3.0, Dec. 2012, 91 pages.

\* cited by examiner

SERVICE PROCESSING METHOD AND RELATED DEVICE

CROSS-REFERENCE TO RELATED APPLICATIONS

This application is a continuation of U.S. patent application Ser. No. 14/806,231, filed on Jul. 22, 2015, which is a continuation of International Application No. PCT/CN2013/070937, filed on Jan. 24, 2013. The afore-mentioned patent applications are hereby incorporated by reference in their entireties.

TECHNICAL FIELD

Embodiments of the present disclosure relate to the communications field, and in particular, to a service processing method and related devices.

BACKGROUND

FIG. 1 is a schematic diagram of an architecture of a network for performing location registration by a user equipment (UE, User Equipment).

The network architecture includes a home subscriber server/home location register (HSS/HLR, Home Subscriber Server/Home Location Register), a mobility management node (MMN, Mobility Management Node), a mobile switching center/visit location register (MSC/VLR, Mobile Switching Center/Visit Location Register), and a UE.

The HSS/HLR mainly includes subscriber subscription information and location information; the MMN may be a serving GPRS support node (SGSN, Serving GPRS Support Node) of a serving GERAN/UTRAN network or a mobility management entity (MME, Mobility Management Entity) of a serving LTE network; the MSC/VLR mainly provides a circuit domain service and location management.

When the UE moves between a 2G/3G system and an LTE system, the UE performs location registration by using a process of a routing area update (RAU, Routing Area Update), or location area update (LAU, Location Area Update), or tracking area update (TAU, Tracking Area Update). For a short message service (SMS, Short Message Service), when a short message of the UE needs to be delivered, a short message center obtains address information of a node serving the UE by means of a query from the HSS. The HSS/HLR needs to return a correct address of the serving node according to registration information of the UE in the MSC/VLR, SGSN, or MME. The short message center forwards the short message to the corresponding serving node after receiving the address of the node serving the UE, and the serving node sends the short message to the UE.

With continuous development of wireless network communications, at present, an emerging communication manner, namely machine type communication (MTC, Machine Type Communication), is gradually popularized. The MTC means network communication performed between one or more nodes or devices without human intervention, and a user equipment in such a communication mode is called a machine to machine (M2M, Machine to Machine) user equipment.

In an MTC system, some M2M user equipments do not need circuit domain voice services, and all services (including short messages) thereof may be obtained from a packet domain. To prevent an impact on performance of the MSC from excessive M2M user equipments, the 3GPP specifies that the MME/SGSN may enhance a short message function of the MSC and provide a short message service for a user, thereby reducing a load of processing the short message by the MSC.

In the prior art, when the M2M user equipment requires only a short message from the MSC, a combined attach or combined tracking area update request is sent to the MME, the message may include an indication of "SMS only", and this indication depends on a preference of the M2M user equipment.

After the MME receives the message, the MME sends, according to an operator policy configured on the MME and/or subscription data of the user equipment (for example, there is only a short message service in CS domain subscription), the message to the HSS to request to be registered as a short message serving node. When a short message needs to be delivered, the HSS sends an address of the MME to the short message center, the short message center sends the short message to the MME, and the MME delivers the short message to the UE.

In the foregoing technical solution, the M2M user equipment may no longer obtain the short message from the MME in the following two situations: the preference of the M2M user equipment changes, for example, changes from "requiring only a short message service" to "not requiring the MME or MSC to provide a short message service", which is specifically that the UE initiates only an independent attach or tracking area update process without requesting to be registered in the CS domain to obtain the short message service and the short message is transmitted by using an IP data packet when the UE registers with the MME; the operator policy on the MME changes, and an operator no longer requires the MME to provide the short message service.

SUMMARY

In one embodiment, a service processing method is disclosed that includes receiving, by a mobility management entity (MME), an access request message from a user equipment, determining, by the MME, whether the access request message from the user equipment is an attach message or a tracking area update request message, and if the MME has been registered as a short message serving node of the user equipment in a home subscriber server (HSS) and it is determined that the access request message is the attach message or the tracking area update request message, sending, by the MME, a notification to the HSS to inform the HSS to cancel registration of the MME as the short message serving node of the user equipment.

In another embodiment, a mobility management entity (MME) is disclosed that includes a memory storage comprising instructions and one or more processors in communication with the memory. The one or more processors execute the instructions to receive an access request message sent by a user equipment, determine whether the access request message from the user equipment is an attach message or a tracking area update request message, and send a notification to a home subscriber server (HSS) to inform the HSS to cancel registration of the MME as the short message serving node of the user equipment in the HSS if the MME has been registered as a short message serving node of the user equipment in the HSS and it is determined that the access request message is the attach message or the tracking area update request message.

DETAILED DESCRIPTION

Embodiments of the present disclosure provide a service processing method and system, and related devices, which can cancel registration of an MME as a short message serving node from an HSS according to a requirement in a timely manner to reduce the number of short message sending failures, thereby saving network resources.

Figure 1:
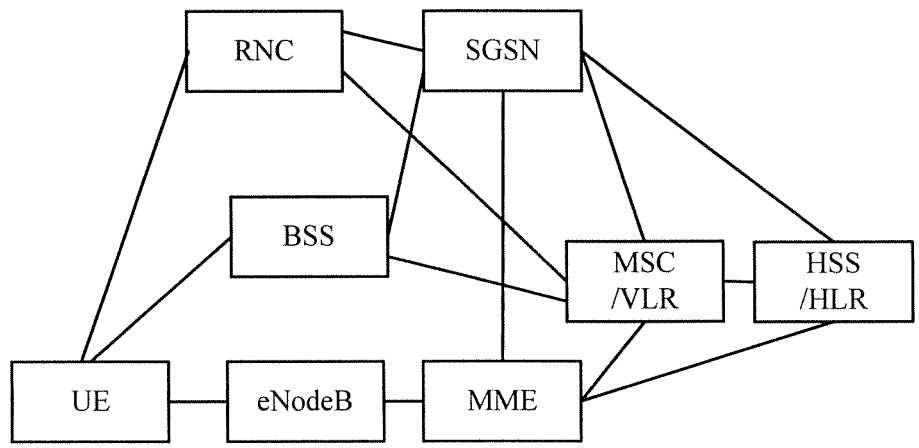
FIG. 1 is a schematic diagram of an architecture of a network for performing location registration by a UE in the prior art.
Figure 2:
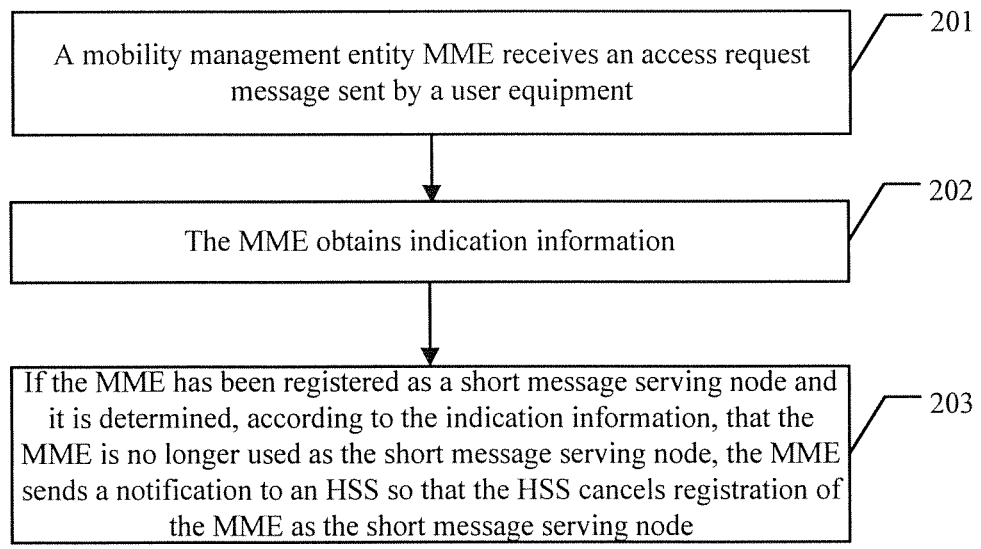
FIG. 2 is a schematic diagram of an embodiment of a service processing method in embodiments of the present disclosure.

Referring to FIG. 2, an embodiment of the service processing method in the embodiments of the present disclosure includes:

201. An MME receives an access request message sent by a user equipment.

In the present disclosure, the access request message is any one of an attach request message, a tracking area update request message, a combined attach request message, and a combined tracking area update request message.

202. The MME obtains indication information.

In this embodiment, the MME may obtain the indication information during a network communication process, where the indication information may be indication information sent by the user equipment or configuration information configured by an operator.

The indication information may be a direct indication, and may also be an indirect indication, which is not specifically limited herein.

203. If the MME has been registered as a short message serving node and it is determined, according to the indication information, that the MME is no longer used as the short message serving node, the MME sends a notification to an HSS so that the HSS cancels registration of the MME as the short message serving node.

In this embodiment, if the MME has been registered as the short message serving node and it is determined, according to the indication information, that the MME is no longer used as the short message serving node, it indicates that the MME is no longer used to forward a short message to be sent to the user equipment. Therefore, the MME may send the notification to the HSS so that the HSS cancels the registration of the MME as the short message serving node, and this process is a "process of deregistering the short message serving node".

In this embodiment, the MME may obtain the indication information; if the MME has been registered as the short message serving node and it is determined, according to the indication information, that the MME is no longer used as the short message serving node, the MME may send the notification to the HSS so that the HSS cancels the registration of the MME as the short message serving node, thereby ensuring that the MME is no longer involved in a subsequent short message forwarding process. When a short message needs to be delivered, the HSS may no longer return an address of the MME, which may reduce the number of short message sending failures, thereby saving network resources.

Figure 3:
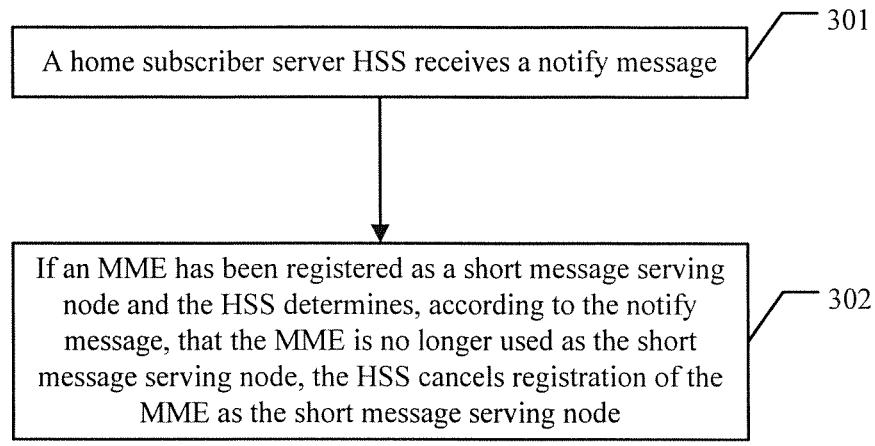
FIG. 3 is a schematic diagram of another embodiment of a service processing method in the embodiments of the present disclosure.

The foregoing describes the service processing method in the embodiments of the present disclosure from the perspective of an MME. The following describes the service processing method in the embodiments of the present disclosure from the perspective of an HSS. Referring to FIG. 3, another embodiment of the service processing method in the embodiments of the present disclosure includes:

301. An HSS receives a notify message.

In this embodiment, the HSS may obtain the notify message during a network communication process, where the notify message may be a notify message sent by an MME, or a notify message sent by another network element in a communications network, including but not limited to a notify message sent by an IP short message server.

302. If an MME has been registered as a short message serving node and the HSS determines, according to the notify message, that the MME is no longer used as the short message serving node, the HSS cancels registration of the MME as the short message serving node.

In this embodiment, if the MME has been registered as the short message serving node and the HSS determines, according to the notify message, that the MME is no longer used as the short message serving node, it indicates that the MME is no longer used to forward a short message to be sent to a user equipment. Therefore, the HSS may cancel the registration of the MME as the short message serving node, and the process is a "process of deregistering the short message serving node".

In this embodiment, the HSS may obtain the notify message; if the MME has been registered as the short message serving node and the HSS determines, according to the notify message, that the MME is no longer used as the short message serving node, the HSS may cancel the registration of the MME as the short message serving node, thereby ensuring that the MME is no longer involved in a subsequent short message forwarding process. When a short message needs to be delivered, the HSS may no longer return an address of the MME, which may reduce the number of short message sending failures, thereby saving network resources.

For ease of understanding, the following describes the service processing method in the embodiments of the present disclosure from the perspective of interaction between an MME and an HSS. It should be noted that: according to an entity triggering a process of deregistering a short message serving node, the service processing method in the embodiments of the present disclosure may be implemented in multiple manners, which are separately described as follows:

I. The MME triggers the process of deregistering the short message serving node.

Figure 4:
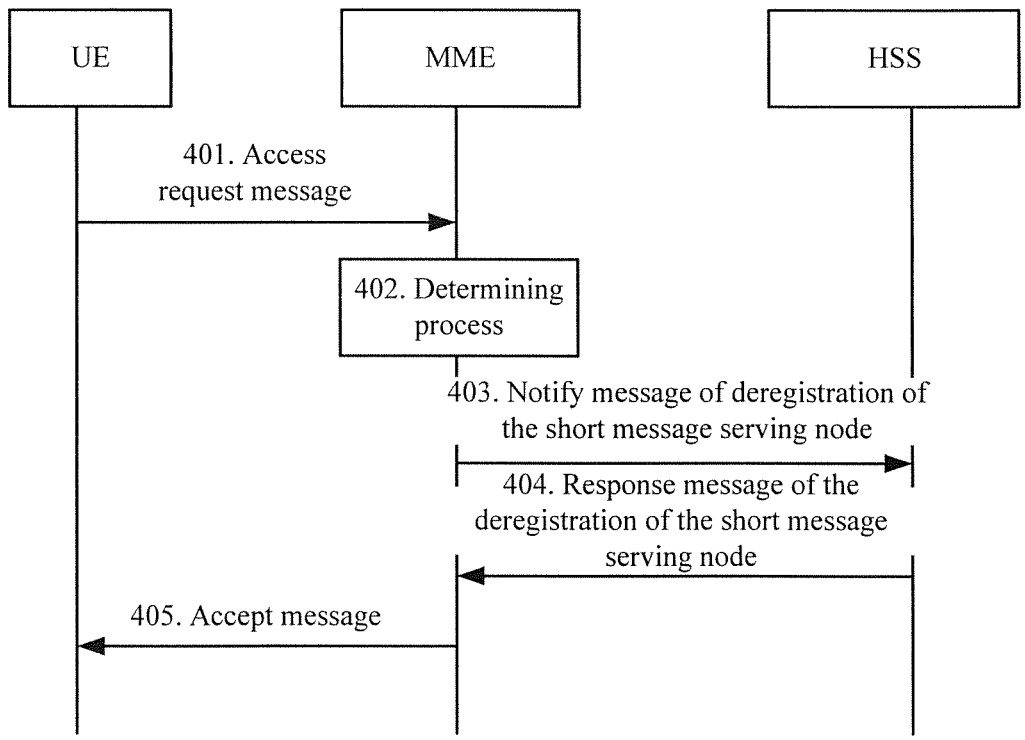
FIG. 4 is a schematic diagram of another embodiment of a service processing method in the embodiments of the present disclosure.

In this embodiment, the MME may trigger the process of deregistering the short message serving node according to received indication information. Specifically, referring to FIG. 4, another embodiment of the service processing method in the embodiments of the present disclosure includes:

401. A user equipment sends an access request message to the MME.

In this embodiment, the user equipment may send the access request message in a process of interacting with the MME. The access request message may be any one of an attach request message, a tracking area update request message, a combined attach request message, and a combined tracking area update request message.

402. The MME executes a determining process.

After receiving the access request message sent by the user equipment, the MME may execute the determining process to determine whether the access request message sent by the user equipment is an attach (attach) message or a tracking area update request (TAU request) message. If the access request message sent by the user equipment is the attach message or tracking area update request message and the MME has been registered as a short message serving node of the user equipment in an HSS, it indicates that the MME is no longer used as the short message serving node.

It should be noted that: in this embodiment, that the MME receives the access request message from the user equipment is used as an example for description; the MME may also perform determining according to configuration information configured by an operator, which is specifically:

the MME may determine, according to the configuration information configured by the operator, whether the MME is no longer used to send a short message to the user equipment. If the MME is no longer used to send a short message to the user equipment and the MME has been registered as the short message serving node of the user equipment in the HSS, it is determined that the MME is no longer used as the short message serving node.

403. The MME sends a notify message of deregistration of the short message serving node to an HSS;

After it is determined that the MME is no longer used as the short message serving node, the MME may send the notify message of deregistration of the short message serving node to the HSS, so as to cancel, in the HSS, registration of the MME as the short message serving node.

It should be noted that: in this embodiment, the MME may send the notify message of deregistration of the short message serving node to the HSS in multiple manners.

For example, the MME may reuse an existing location area update message (LAU), or a purge message (purge), or a notify request message (notify request) as the notify message of deregistration of the short message serving node, or may introduce, between the MME and the HSS, one new custom message (de-register as an SMS serving node) as the notify message of deregistration of the short message serving node.

The MME may carry indication information in the notify message of deregistration of the short message serving node that is sent, where the indication information is used for indicating, to the HSS, that the MME is no longer used as the short message serving node, the indication information may be identified by using a value of an information element or identified by whether an information element exists, or a registration notify message sent by the MME is a type of indication information, which indicates, to the HSS, that the MME is no longer used as the short message serving node, which is not specifically limited herein.

404. The HSS sends a response message of the deregistration of the short message serving node to the MME.

After the HSS receives the notify message of deregistration of the short message serving node sent by the MME, if the message includes the indication information used for indicating that the MME is no longer used as the short message serving node, or the notify message indicates that the MME is no longer used as the short message serving node, the HSS may determine that the MME is no longer used as the short message serving node, and the HSS may cancel the registration of the MME as the short message serving node according to the indication of the MME, but still keep registration of the MME as an EPS serving node, and return the response message of the deregistration of the short message serving node, which indicates that the registration of the MME as the short message serving node has been canceled, to the MME.

405. The MME sends an accept message to the user equipment.

After receiving the response message of the deregistration of the short message serving node sent by the HSS, the MME may send, to the user equipment, an accept message corresponding to the access request message, which is used as a feedback to the access request message sent by the user equipment.

In this embodiment, the MME may obtain the indication information; if the MME has been registered as the short message serving node and it is determined, according to the indication information, that the MME is no longer used as the short message serving node, the MME may send a notification to the HSS so that the HSS cancels the registration of the MME as the short message serving node, thereby ensuring that the MME is no longer involved in a subsequent short message forwarding process. When a short message needs to be delivered, the HSS may no longer return an address of the MME, which may reduce the number of short message sending failures, thereby saving network resources.

II. The HSS triggers the process of deregistering the short message serving node.

Figure 5:
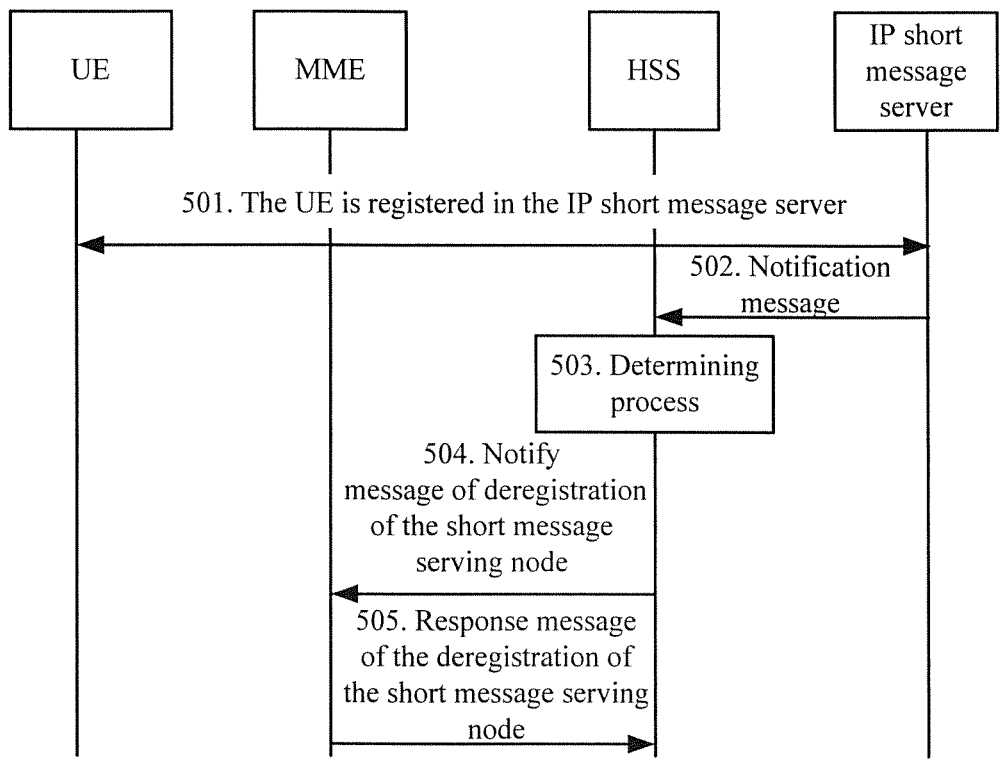
FIG. 5 is a schematic diagram of another embodiment of a service processing method in the embodiments of the present disclosure.

In this embodiment, the HSS may trigger the process of deregistering the short message serving node according to a received notify message. Specifically referring to FIG. 5, another embodiment of the service processing method in the embodiments of the present disclosure includes:

501. A user equipment is registered in an IP short message server.

In this embodiment, when a user wants to start using an IP short message service, a corresponding user equipment may be registered in the IP short message server. A specific registration process is common knowledge of a person skilled in the art and is not limited herein.

The IP short message server in this embodiment may be an IP short message gateway (IP-SM-GW), or another application server that is capable of providing a short message service.

502. The IP short message server sends a notify message to an HSS.

After the user equipment is successfully registered in the IP short message server, the IP short message server may send the notify message to the HSS, where the notify message indicates, to the HSS, that the user equipment has been successfully registered in the IP short message server, and the message includes a user equipment identifier.

503. The HSS executes a determining process.

After receiving the notify message sent by the IP short message server, the HSS may execute the determining process to determine whether the notify message indicates that the user equipment has been successfully registered in the IP short message server. If the notify message indicates that the user equipment has been successfully registered in the IP short message server and an MME has been registered as a short message serving node, the HSS determines that the MME is no longer used as the short message serving node.

504. The HSS sends a notify message of deregistration of the short message serving node to an MME.

After the HSS determines that the MME has been registered as the short message serving node and the user equipment has been successfully registered in the IP short message server, the HSS may cancel registration of the MME as the short message serving node, but still keep registration of the MME as an EPS serving node, and send the notify message of deregistration of the short message serving node to the MME, so as to notify the MME that the MME is no longer used as the short message serving node.

It should be noted that: in this embodiment, the HSS may send the notify message of deregistration of the short message serving node to the MME in multiple manners.

For example, the HSS may reuse an existing cancel location request (cancel location request) message or an insert subscriber data (insert subscriber data) message as the notify message of deregistration of the short message serving node, or may introduce, between the HSS and the MME, one new custom message (de-register as an SMS serving node) as the notify message of deregistration of the short message serving node.

The notify message of deregistration of the short message serving node may notify the MME that the MME is no longer used as the short message serving node, or the HSS may also carry indication information in the notify message of deregistration of the short message serving node that is sent, where the indication information is used for notifying that the MME is no longer used as the short message serving node, and the indication information may be identified by using a value of an information element or identified by whether an information element exists, which is not specifically limited herein.

505. The MME sends a response message of the deregistration of the short message serving node to the HSS.

In this embodiment, after the MME receives the notify message of deregistration of the short message serving node sent by the HSS and it is determined that the MME is no longer used as the short massage serving node, the MME may return the response message of the deregistration of the short message serving node to the HSS, but is still used as an EPS serving node for services.

In this embodiment, the HSS may obtain the notify message; if the MME has been registered as the short message serving node and the HSS determines, according to the notify message, that the MME is no longer used as the short message serving node, the HSS may cancel the registration of the MME as the short message serving node, thereby ensuring that the MME is no longer involved in a subsequent short message forwarding process. When a short message needs to be delivered, the HSS may no longer return an address of the MME, which may reduce the number of short message sending failures, thereby saving network resources.

Figure 6:
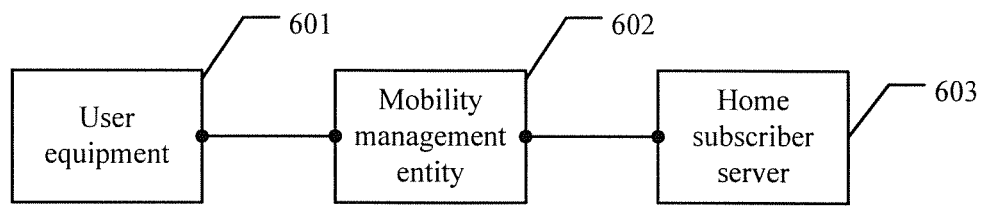
FIG. 6 is a schematic diagram of an embodiment of a service processing system in the embodiments of the present disclosure.

The foregoing describes the service processing method in the embodiments of the present disclosure, and the following describes a service processing system in the embodiments of the present disclosure. Referring to FIG. 6, an embodiment of the service processing system in the embodiments of the present disclosure includes:

a user equipment 601, a mobility management entity 602 and a home subscriber server 603, where the mobility management entity 602 is configured to: receive an access request message sent by the user equipment 601; obtain indication information; and send a notification to the home subscriber server 603 so that the HSS 603 cancels registration of the mobility management entity 602 as a short message serving node if the mobility management entity 602 has been registered as the short message serving node and it is determined, according to the indication information, that the MME is no longer used as the short message serving node;

the user equipment 601 is configured to send a message to the mobility management entity 602; and the home subscriber server 603 is configured to interact with the mobility management entity 602 to cancel the registration of the mobility management entity 602 as the short message serving node.

For ease of understanding, the following uses a specific application scenario as an example to describe interaction between network elements in the service processing system in this embodiment.

The user equipment 601 may send the access request message to the mobility management entity 602 in a process of interacting with the mobility management entity 602.

The access request message may be any one of an attach request message, a tracking area update request message, a combined attach request message, and a combined tracking area update request message.

After receiving the access request message sent by the user equipment 601, the mobility management entity 602 may execute a determining process to determine whether the access request message sent by the user equipment 601 is an attach message (attach) or a tracking area update request message (TAU request). If the access request message sent by the user equipment 601 is the attach message or tracking area update request message, it indicates that the mobility management entity 602 is no longer used as the short message serving node.

It should be noted that: in this embodiment, that the mobility management entity 602 receives the access request message from the user equipment 601 is used as an example for description; the mobility management entity 602 may also perform determining according to configuration information configured by an operator, which is specifically:

the mobility management entity 602 may locally obtain the configuration information configured by the operator, and determine whether the configuration information indicates that the mobility management entity 602 is no longer used to send a short message to the user equipment 601. If the configuration information indicates that the mobility management entity 602 is no longer used to send the short message to the user equipment 601, it is determined that the mobility management entity 602 is no longer used as the short message serving node.

It may be understood that: in an actual application, the mobility management entity 602 may further determine whether it is no longer used as the short message serving node by means of more approaches, which is not specifically limited herein.

After the mobility management entity 602 determines that it is no longer used as the short message serving node, the mobility management entity 602 may send a notify message of deregistration of the short message serving node to the home subscriber server 603, so as to cancel, in the home subscriber server 603, the registration of the mobility management entity 602 as the short message serving node.

It should be noted that: in this embodiment, the mobility management entity 602 may send the notify message of deregistration of the short message serving node to the home subscriber server 603 in multiple manners.

For example, the mobility management entity 602 may reuse an existing location area update message (LAU), a purge message (purge), or a notify request message (notify request) as the notify message of deregistration of the short message serving node, or may introduce, between the mobility management entity 602 and the home subscriber server 603, one new custom message (de-register as a SMS serving node) as the notify message of deregistration of the short message serving node.

The mobility management entity 602 may carry indication information in the notify message of deregistration of the short message serving node that is sent, where the indication information is used for indicating, to the home subscriber server 603, that the mobility management entity 602 is no longer used as the short message serving node, the indication information may be identified by using a value of an information element or identified by whether an information element exists, or a registration notify message sent by the mobility management entity 602 is a type of indication information, which indicates, to the home subscriber server 603, that the mobility management entity 602 is no longer used as the short message serving node, which is not specifically limited herein.

After the home subscriber server 603 receives the notify message of deregistration of the short message serving node sent by the mobility management entity 602, if the message includes the indication information used for indicating that the mobility management entity 602 is no longer used as the short message serving node, or the notify message indicates that the mobility management entity 602 is no longer used as the short message serving node, the home subscriber server 603 may determine that the mobility management entity 602 is no longer used as the short message serving node, and the home subscriber server 603 may cancel the registration of the mobility management entity 602 as the short message serving node according to the indication of the mobility management entity 602, but still keep registration of the mobility management entity 602 as an EPS serving node, and return a response message of the deregistration of the short message serving node, which indicates that the registration of the mobility management entity 602 as the short message serving node has been canceled, to the mobility management entity 602.

After receiving the response message of the deregistration of the short message serving node fed back by the home subscriber server 603, the mobility management entity 602 may send, to the user equipment, an accept message corresponding to the access request message, which is used as a feedback to the access request message sent by the user equipment.

In this embodiment, the mobility management entity 602 may obtain the indication information; if the mobility management entity 602 has been registered as the short message serving node and it is determined, according to the indication information, that the mobility management entity 602 is no longer used as the message serving node, the mobility management entity 602 may send the notification to the home subscriber server 603 so that the home subscriber server 603 cancels the registration of the mobility management entity 602 as the short message serving node, thereby ensuring that the mobility management entity 602 is no longer involved in a subsequent short message forwarding process. When a short message needs to be delivered, the home subscriber server 603 may no longer return an address of the mobility management entity 602, which may reduce the number of short message sending failures, thereby saving network resources.

Figure 7:
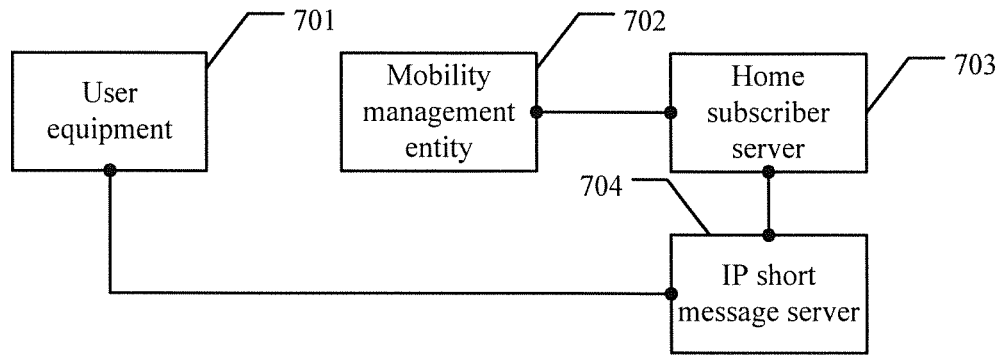
FIG. 7 is a schematic diagram of another embodiment of a service processing system in the embodiments of the present disclosure.

Referring to FIG. 7, another embodiment of the service processing system in the embodiments of the present disclosure includes:

a user equipment 701, a mobility management entity 702, a home subscriber server 703, and an IP short message server 704, where the user equipment 701 is configured to register with the IP short message server 704;

the IP short message server 704 is configured to send a notify message to the home subscriber server 703; and the home subscriber server 703 is configured to: receive the notify message; and cancel registration of the mobility management entity 702 as a short message serving node if the mobility management entity 702 has been registered as the short message serving node and the home subscriber server 703 determines, according to the notify message, that the mobility management entity 702 is no longer used as the short message serving node.

For ease of understanding, the following uses a specific application scenario as an example to describe interaction between network elements in the service processing system in this embodiment.

In this embodiment, when a user wants to start using an IP short message service, the corresponding user equipment 701 may be registered in the IP short message server 704. A specific registration process is common knowledge of a person skilled in the art and is not limited herein.

The IP short message server 704 in this embodiment may be an IP short message gateway (IP-SM-GW), or another application server that is capable of providing a short message service.

After the user equipment 701 is successfully registered in the IP short message server 704, the IP short message server 704 may send the notify message to the home subscriber server 703.

After receiving the notify message sent by the IP short message server 704, the home subscriber server 703 may execute a determining process to determine whether the notify message indicates that the user equipment 701 has been successfully registered in the IP short message server 704. If the notify message indicates that the user equipment 701 has been successfully registered in the IP short message server 704 and the mobility management entity 702 has been registered as the short message serving node, the home subscriber server 703 determines that the mobility management entity 702 is no longer used as the short message serving node.

After the home subscriber server 703 determines that the mobility management entity 702 has been registered as the short message serving node and the user equipment 701 has been successfully registered in the IP short message server 704, the home subscriber server 703 may cancel the registration of the mobility management entity 702 as the short message serving node, but still keep registration of the mobility management entity 702 as an EPS serving node, and send a notify message of deregistration of the short message serving node to the mobility management entity 702, so as to notify the mobility management entity that the mobility management entity 702 is no longer used as the short message serving node.

It should be noted that: in this embodiment, the home subscriber server 703 may send the notify message of deregistration of the short message serving node to the MME in multiple manners.

For example, the home subscriber server 703 may reuse an existing cancel location request (cancel location request) message, or an insert subscriber data (insert subscriber data) message as the notify message of deregistration of the short message serving node, or may introduce, between the home subscriber server 703 and the mobility management entity 702, one new custom message (de-register as a SMS serving node) as the notify message of deregistration of the short message serving node.

The notify message of deregistration of the short message serving node may notify the mobility management entity 702 that the mobility management entity 702 is no longer used as the short message serving node, or the home subscriber server 703 may also carry indication information in the notify message of deregistration of the short message serving node that is sent, where the indication information is used for notifying that the mobility management entity 702 is no longer used as the short message serving node, and the indication information may be identified by using a value of an information element or identified by whether an information element exists, which is not specifically limited herein.

In this embodiment, after the mobility management entity 702 receives the notify message of deregistration of the short message serving node sent by the home subscriber server 703 and it is determined that the mobility management entity 702 is no longer used as the short message serving node, the mobility management entity 702 may return a response message of the deregistration of the short message serving node to the home subscriber server 703, but is still used as an EPS serving node for services.

In this embodiment, the home subscriber server 703 may obtain the notification information; if the mobility management entity 702 has been registered as the short message serving node and the home subscriber server 703 determines, according to the notification information, that the mobility management entity 702 is no longer used as the short message serving node, the home subscriber server 703 may cancel the registration of the MME as the short message serving node, thereby ensuring that the mobility management entity 702 is no longer involved in a subsequent short message forwarding process. When a short message needs to be delivered, the home subscriber server 703 may no longer return an address of the mobility management entity 702, which may reduce the number of short message sending failures, thereby saving network resources.

Figure 8:
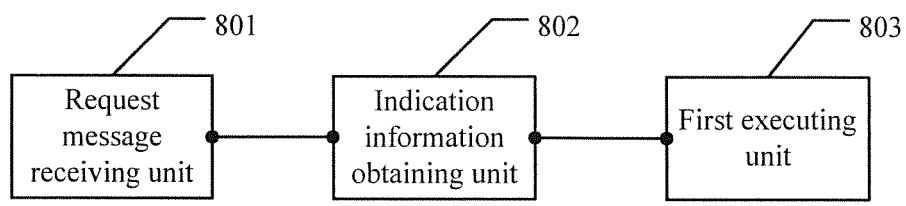
FIG. 8 is a schematic diagram of an embodiment of a mobility management entity in the embodiments of the present disclosure.

The following describes related devices in the embodiments of the present disclosure. Referring to FIG. 8, an embodiment of a mobility management entity in the embodiments of the present disclosure includes:

a request message receiving unit 801, configured to receive an access request message sent by a user equipment;

an indication information obtaining unit 802, configured to obtain indication information; and a first executing unit 803, configured to: when the MME has been registered as a short message serving node and it is determined, according to the indication information, that the MME is no longer used as the short message serving node, send a notification to a home subscriber server HSS so that the HSS cancels registration of the MME as the short message serving node.

The first executing unit 803 in this embodiment is specifically configured to: when the MME has been registered as the short message serving node of the user equipment and the access request message sent by the user equipment is an attach message or a tracking area update request message, send the notification to the HSS so that the HSS cancels the registration of the MME as the short message serving node.

Alternatively, the indication information obtaining unit 802 in this embodiment is specifically configured to locally obtain configuration information configured by an operator; and the first executing unit 803 is specifically configured to: when the MME has been registered as the short message serving node and it is determined, according to the configuration information, that the MME is no longer used to send a short message to the user equipment, send the notification to the HSS so that the HSS cancels the registration of the MME as the short message serving node.

In this embodiment, the indication information obtaining unit 802 may obtain the indication information; if the MME has been registered as the short message serving node and the first executing unit 803 determines, according to the indication information, that the MME is no longer used as the short message serving node, the first executing unit 803 may send the notification to the HSS so that the HSS cancels the registration of the MME as the short message serving node, thereby ensuring that the mobility management entity is no longer involved in a subsequent short message forwarding process. When a short message needs to be delivered, the HSS may no longer return an address of the mobility management entity, which may reduce the number of short message sending failures, thereby saving network resources.

Figure 9:
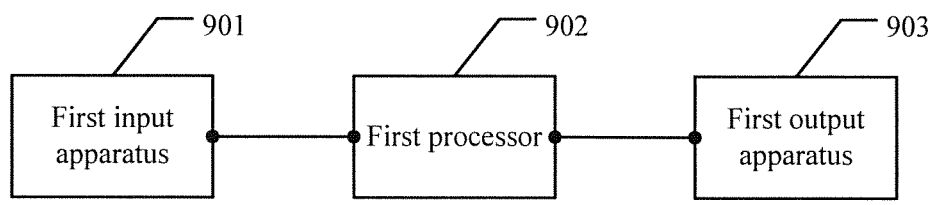
FIG. 9 is a schematic diagram of another embodiment of a mobility management entity in the embodiments of the present disclosure.

Referring to FIG. 9, another embodiment of a mobility management entity in the embodiments of the present disclosure includes:

a first input apparatus 901, a first processor 902 and a first output apparatus 903, where the first processor 902 executes the following process:

receive an access request message sent by a user equipment; obtain indication information; and send a notification to a home subscriber server HSS so that the HSS cancels registration of the MME as a short message serving node if the MME has been registered as the short message serving node and it is determined, according to the indication information, that the MME is no longer used as the short message serving node.

In this embodiment, the first processor 902 may obtain the indication information; if the MME has been registered as the short message serving node and it is determined, according to the indication information, that the MME is no longer used as the short message serving node, the first processor 902 may send the notification to the HSS so that the HSS cancels the registration of the MME as the short message serving node, thereby ensuring that the MME is no longer involved in a subsequent short message forwarding process.

When a short message needs to be delivered, the HSS may no longer return an address of the MME, which may reduce the number of short message sending failures, thereby saving network resources.

Figure 10:
FIG. 10 is a schematic diagram of an embodiment of a home subscriber server in the embodiments of the present disclosure.

Referring to FIG. 10, an embodiment of a home subscriber server in the embodiments of the present disclosure includes:

a notify message receiving unit 1001, configured to receive a notify message; and a second executing unit 1002, configured to: when an MME has been registered as a short message serving node and it is determined, according to the notify message, that the mobility management entity is no longer used as the short message serving node, cancel registration of the MME as the short message serving node.

The notify message receiving unit 1001 in this embodiment is specifically configured to receive a notify message of deregistration of the short message serving node sent by the MME; and the second executing unit 1002 is specifically configured to: when the MME has been registered as the short message serving node and the notify message of deregistration of the short message serving node sent by the MME carries indication information used for indicating that the MME is no longer used as the short message serving node, cancel the registration of the MME as the short message serving node.

Alternatively, the notify message receiving unit 1001 in this embodiment is specifically configured to receive a notify message sent by an IP short message server; and the second executing unit 1002 is specifically configured to: when the MME has been registered as the short message serving node and the notify message sent by the IP short message server indicates that a user equipment has been successfully registered in the IP short message server, cancel the registration of the MME as the short message serving node.

In this embodiment, the notify message receiving unit 1001 may obtain the notify message; if the MME has been registered as the short message serving node and the second executing unit 1002 determines, according to the notify message, that the MME is no longer used as the short message serving node, the second executing unit 1002 may cancel the registration of the MME as the short message serving node, thereby ensuring that the MME is no longer involved in a subsequent short message forwarding process. When a short message needs to be delivered, the HSS may no longer return an address of the MME, which may reduce the number of short message sending failures, thereby saving network resources.

Figure 11:
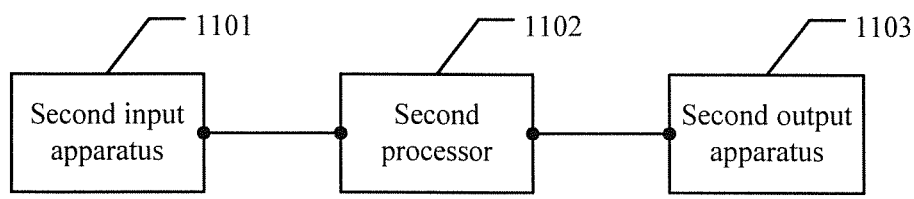
FIG. 11 is a schematic diagram of another embodiment of a home subscriber server in the embodiments of the present disclosure.

Referring to FIG. 11, another embodiment of a home subscriber server in the embodiments of the present disclosure includes:

a second input apparatus 1101, a second processor 1102 and a second output apparatus 1103, where the second processor 1102 executes the following process:

receive a notify message; if an MME has been registered as a short message serving node and it is determined, according to the notify message, that the mobility management entity MME is no longer used as the short message serving node, cancel registration of the MME as the short message serving node.

In this embodiment, the second processor 1102 may obtain the notify message; if the MME has been registered as the short message serving node and the second processor 1102 determines, according to the notify message, that the MME is no longer used as the short message serving node, the second processor 1102 may cancel the registration of the MME as the short message serving node, thereby ensuring that the MME is no longer involved in a subsequent short message forwarding process. When a short message needs to be delivered, the HSS may no longer return an address of the mobility management entity 602, which may reduce the number of short message sending failures, thereby saving network resources.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A service processing method, comprising:
receiving, by a mobility management entity (MME), an access request message from a user equipment;
determining, by the MME, whether the access request message from the user equipment is an attach message or a tracking area update request message; and
if the MME has been registered as a short message serving node of the user equipment in a home subscriber server (HSS) and it is determined that the access request message is the attach message or the tracking area update request message, sending, by the MME, a notification to the HSS to inform the HSS to cancel registration of the MME as the short message serving node of the user equipment.

2. The method according to claim 1, wherein sending, by the MME, a notification to the HSS to inform the HSS to cancel registration of the MME as the short message serving node of the user equipment comprises:
sending, by the MME, a notify message of deregistration of the short message serving node to the HSS.

3. The method according to claim 2, further comprising:
receiving, by the MME, a response message of the deregistration of the short message serving node from the HSS.

4. The method according to claim 2, wherein the notify message of deregistration of the short message serving node indicates that the MME is no longer used as the short message serving node of the user equipment.

5. The method according to claim 2, wherein:
the notify message of deregistration of the short message serving node is a location area update message, a purge message, a notify message, or a custom message; and
the notify message of deregistration of the short message serving node carries indication information indicating that the MME is no longer used as the short message serving node.

6. The method according to claim 1, further comprising:
cancelling, by the HSS, registration of the MME as the short message serving node of the user equipment in response to the notification.

7. A mobility management entity (MME), comprising:
a memory storage comprising instructions; and
one or more processors in communication with the memory, wherein the one or more processors execute the instructions to:
receive an access request message sent by a user equipment,
determine whether the access request message from the user equipment is an attach message or a tracking area update request message, and
send a notification to a home subscriber server (HSS) to inform the HSS to cancel registration of the MME as the short message serving node of the user equipment in the HSS if the MME has been registered as a short message serving node of the user equipment in the HSS and it is determined that the access request message is the attach message or the tracking area update request message.

8. The MME according to claim 7, wherein the notification is a notify message of deregistration of the short message serving node.

9. The MME according to claim 8, wherein the one or more processors further execute the instructions to: receive a response message of the deregistration of the short message serving node from the HSS.

10. The MME according to claim 8, wherein the notify message of deregistration of the short message serving node indicates that the MME is no longer used as the short message serving node of the user equipment.

11. The MME according to claim 8, wherein:
the notify message of deregistration of the short message serving node is a location area update message, a purge message, a notify message, or a custom message; and
the notify message of deregistration of the short message serving node carries indication information indicating that the MME is no longer used as the short message serving node.

* * * * *